United States Patent [19]
Seth et al.

[11] Patent Number: 5,888,607
[45] Date of Patent: Mar. 30, 1999

[54] SOFT LOOP LAMINATE AND METHOD OF MAKING

[75] Inventors: Jayshree Seth, Woodbury; John J. Rogers, St. Paul, both of Minn.

[73] Assignee: Minnesota Mining and Manufacturing Co., St. Paul, Mich.

[21] Appl. No.: 887,863

[22] Filed: Jul. 3, 1997

[51] Int. Cl.$^6$ .................. B32B 3/02; B32B 3/06
[52] U.S. Cl. .................. 428/92; 428/95; 428/97; 428/99; 428/101
[58] Field of Search .................. 428/92, 95, 97, 428/99, 101

[56] References Cited

U.S. PATENT DOCUMENTS

| | | | |
|---|---|---|---|
| 4,761,318 | 8/1988 | Ott et al. | 428/85 |
| 5,032,122 | 7/1991 | Noel et al. | 604/391 |
| 5,256,231 | 10/1993 | Gorman et al. | 156/178 |
| 5,326,612 | 7/1994 | Goulait | 428/100 |
| 5,380,313 | 1/1995 | Goulait et al. | 604/391 |
| 5,407,439 | 4/1995 | Goulait | 604/391 |
| 5,447,590 | 9/1995 | Gilpatrick | 156/178 |
| 5,470,417 | 11/1995 | Goulait | 156/201 |
| 5,547,531 | 8/1996 | Allen et al. | 156/164 |
| 5,569,233 | 10/1996 | Goulait | 604/391 |
| 5,586,371 | 12/1996 | Thomas | 24/452 |
| 5,595,567 | 1/1997 | King et al. | 604/391 |
| 5,605,729 | 2/1997 | Mody et al. | 428/37 |
| 5,614,281 | 3/1997 | Jackson et al. | 428/100 |
| 5,615,460 | 4/1997 | Weirich et al. | 24/446 |
| 5,616,394 | 4/1997 | Gorman et al. | 428/99 |
| 5,699,593 | 12/1997 | Jackson | 24/445 |

FOREIGN PATENT DOCUMENTS

| | | |
|---|---|---|
| 0 341 993 B1 | 5/1989 | European Pat. Off. . |
| 0 765 616 A1 | 9/1995 | European Pat. Off. . |
| WO 95/1270 | 5/1995 | WIPO . |
| WO 95/17111 | 6/1995 | WIPO . |
| WO 95/33390 | 12/1995 | WIPO . |
| WO 96/04812 | 2/1996 | WIPO . |
| WO 96/14459 | 5/1996 | WIPO . |
| WO 96/22065 | 7/1996 | WIPO . |
| WO 97/18084 | 5/1997 | WIPO . |

*Primary Examiner*—Terrel Morris
*Attorney, Agent, or Firm*—Gary L. Griswold; Robert W. Sprague; William J. Bond

[57] ABSTRACT

There is provided a soft nonwoven fibrous loop material for use in hook and loop fastening systems. The nonwoven fibrous loop material of the invention contains an open fibrous loop layer comprised predominately of polypropylene polymer, copolymer or blend fibers. The nonwoven fibrous loop layer material is autogeneously bonded to a backing layer formed of polypropylene polymers or copolymers having a percent isotacticity of less than 70%, optionally with additional layers present provided so that the overall nonwoven fibrous loop material is a laminate having a circular bend stiffness of less than about 9 Newton and having tensile strength of at least 1500 g/2.54 cm-width.

40 Claims, 3 Drawing Sheets

SOFT LOOP LAMINATE AND METHOD OF MAKING

BACKGROUND AND FIELD OF THE INVENTION

The present invention relates to sheets of laminated loop material adapted to be cut into discrete loop patches for use in hook and loop fastening components for low cost applications, particularly disposable diapers and the like.

Nonwoven loop materials intended for use in low cost applications, particularly in respect to disposable garments such as surgical gowns or disposable absorbent articles, such as diapers, have increased in popularity in recent years. This has resulted in intensive development efforts to provide a material that is both high performance for the intended user and low cost. The focus of these efforts has been on providing a low cost loop material which adequately functions to provide a resealable mechanical closure for a limited number of repeated applications. For these uses, it is not necessary that the loop material have sufficient integrity to enable long term repeat attachment and release cycles or resistance to washing. However, the loop material should provide a relatively high peel and secure closure for a limited number of use cycles. Knitted, woven or stitch-bonded and like traditional fabric materials have been proposed in these limited use garment loop applications. Generally, these traditional fabric materials provide more integrity than is needed for the limited use garment field, and are more expensive than required. Lower cost versions of these traditional loop fabric materials have lower fiber density per unit area and hence are lower performance. In response, it has been proposed in a number of patent applications to use nonwoven fabrics of a wide variety of types to form relatively low cost but high, short term performing loop materials. For example, U.S. Pat. No. 5,256,231 is an early patent that proposed the use of a nonwoven web, such as produced by a carding process, to form a loop material. In this patent, the nonwoven web is fed between two corrugating members which provide the nonwoven web material with loft or z-direction orientation. The corrugated web is given integrity in the x and y directions by extruding a thermoplastic backing layer onto tip portions of the corrugated nonwoven material, which is still maintained at this point in the corrugated state between at least one of the corrugating members and a nip backing member. Optional additional layers can be brought in, which additional layers can be printed to provide desired print patterns on the loop material. The process described in this patent provides highly advantageous low cost loop structures. However, particularly when bringing in an additional printed backing layer, the loop material tends to become excessively rigid, particularly when the loop materials are formed from the preferred polypropylene resins described. When a loop material is intended to be used in a disposable, absorbent garment, softness is an extremely important property in order to avoid discomfort for the wearer, as well as providing a conformable form-fitting garment. The use of polyethylene fibers and films or bi-component bonding fibers and the like can provide loop materials with increased softness, however, often at a significant cost increase, increased problems with manufacturability, and/or decreased loop performance. From the standpoint of cost and performance, it is preferable that the nonwoven web material be formed primarily from polypropylene fibers. However, polypropylene fibers present difficulties in providing a soft loop material in that a polypropylene backing or backing film layer is generally required in order to provide adequate fiber anchorage, and polypropylene backing films are relatively stiff.

U.S. Pat. No. 5,614,281 describes a method for forming nonwoven loop materials by microrexing or creping a specific nonwoven material while simultaneously bonding it to a film or nonwoven backing material. The specific end product loop materials exemplified are described as being soft where the nonwoven web is formed from melt-spun fibers of a random copolymer of propylene and ethylene and the film backing layer is a blend of polypropylene with about 16% polyethylene. However, this process suffers from the disadvantage that the nonwoven loop material must be prebonded in order to survive the creping process which process results in significant shear forces on the web during creping. Prebonding decreases the penetrability of the web to hook materials, decreasing performance in the hook and loop laminate structure. The shear forces can also cause fibers to shed or become dislodged in the web. Creping also results in a web with uneven or irregular corrugations which results in uneven bonding to the backing layer. Further, the polypropylene film backing material specifically suggested is still relatively stiff.

A number of other patents have proposed the use of nonwoven materials for use in forming loop structures including, for example, U.S. Pat. No. 5,032,122, wherein a nonwoven web or series of filaments are bonded to a material in an oriented unstable state. The unstable oriented material is subsequently allowed to recover gathering the nonwoven web or fibers to form upstanding loop structures. WO 96/04812 describes a similar method for forming a loop material where the backing is an elastomeric material and the nonwoven web forming the loops is bonded to the backing with a specific bond pattern. This loop material would suffer from numerous disadvantages, such as being generally dimensionally unstable when elastic materials are provided as the backing; relatively low levels of bonding to, e.g., a nonwoven polypropylene loop material; require high cost backing materials; and are somewhat difficult to manufacture. A similar approach is described in WO 95/33390 where the backing is an elastomeric adhesive material. This elastomeric adhesive film described allegedly provides an unstable film material capable of retracting to form the attached nonwoven web into loops and also provide a certain level of bonding to the nonwoven material. This approach would generally suffer from the identical problems associated with the WO 96/4812 published application described above and also has generally poor adhesion properties.

Other nonwoven loop fastening materials are described in U.S. Pat. Nos. 5,470,417 and 5,326,612 which relate to non-corrugated, nonwoven materials having specific bonding patterns and layer structures used to form loop materials.

Despite the extensive levels of activity and development efforts in using nonwoven fabrics for forming loop materials, there is still a need for providing a low cost, high performance nonwoven loop material which is also easy to manufacture, has good fiber to backing adhesion, and is soft and conformable with additionally having the ability to be bonded to a further layer having desirable properties such as a printing pattern while remaining relatively soft.

SUMMARY OF THE INVENTION

The present invention is related to a soft nonwoven fibrous loop material for use in hook and loop fastening systems. The nonwoven fibrous loop material of the invention contains an open fibrous loop layer comprised predominately of polypropylene polymer, copolymer or blend fibers. The preferred nonwoven fibrous loop layer has a sufficient degree of open areas between the fibers as to allow penetration and engagement by hook elements on complimentary hook materials and also a significant degree of z-direction loft such as to allow at least the fiber engaging portion of complimentary hook material elements to fully penetrate the nonwoven fibrous loop layer material and selectively engage fibrous loop structures present therein. The nonwoven fibrous loop layer material is autogeneously bonded to a backing layer formed of polypropylene polymers or copolymers having a percent isotacticity of less than 70%, optionally with additional layers present provided so that the overall nonwoven fibrous loop material is a laminate having a circular bend stiffness of less than about 9 Newton and having tensile strength at yield of at least 1500 g/2.54 cm-width.

BRIEF DESCRIPTION OF THE DRAWINGS

The present invention is further described in reference to accompanying drawings, where unlike reference numerals refer to like parts on several views, and wherein.

DETAILED DESCRIPTION OF THE INVENTION

Figure 1:
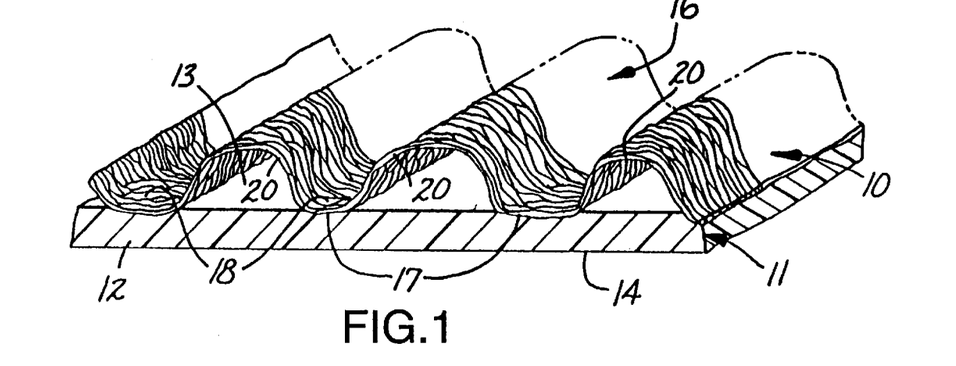
FIG. 1 is a perspective view of a first embodiment of sheet material prepared according to the present invention.

FIG. 1 illustrates a first embodiment of a sheet of loop material according to the present invention, generally designated by the reference numeral 10 which sheet of loop material 10 is adapted to be cut into pieces to form the loop portions for fasteners of the type intended for limited use garments and having releasably engagable hook and loop portions. Generally the sheet of loop material 10 has a backing 11 comprising a thermoplastic backing layer 12 formed from polypropylene polymer or copolymer, the polypropylene generally having an isotaticity of less than about 70 percent. The backing layer 12 is preferably a film layer having a thickness in the range of about 0.00125 to 0.025 centimeters (0.0005 to 0.010 inch) and also preferably having generally uniform morphology, and front and rear major surfaces 13 and 14. A multiplicity of fibers in a formed sheet of fibers 16 having generally non-deformed anchor portions 17 is autogeneously bonded to the backing layer 12. The bonding locations 18 in FIG. 1 are along the front surface 13 with arcuate portions 20 of the sheet of fibers 16 projecting from the front surface 13 of the backing layer 12 between the bonding locations 18. As shown in FIG. 1 the bonding locations can be continuous rows extending transversely across the sheet of loop material 10. However the bonding locations can be arranged in any pattern including, for example, intermittent lines, hexagonal cells, diamond cells, square cells, random point bonds, patterned point bonds, crosshatched lines, or any other regular or irregular geometric pattern.

The arcuate portions 20 of the sheet of fibers 16 between adjacent bonding locations have a generally uniform maximum height from the backing layer 12 of less than about 0.64 centimeters (0.250 inch) and preferably less than about 0.381 centimeters (0.150 inch). The height of the arcuate portions 20 of the formed sheet of fibers 16 is at least one third, and preferably one half to one and one half times the distance between adjacent bonding locations 18. The majority of the individual fibers in the sheet of fibers 16 are preferably less than 25 denier (preferably in the range of 1 to 20 denier) in size. The use of fibers in the sheet of fibers outside this range can be useful in certain circumstances in fiber blends or occasionally alone. However, the use of lower denier fibers, at least in part, are preferred in terms of providing soft loop materials with good engageability with the smaller hook elements generally used in low cost hook and loop fasteners. The loop material without the backing has a basis weight in the range of 5 to 300 grams per square meter (and preferably in the range of 15 to 100 grams per square meter) measured along the first surface 13. The fibers in the sheet of fibers should have sufficient space between them so that the open area between the fibers in the sheet of fibers 16 along the arcuate portions 20 (i.e., between about 10 and 90 percent open area) afford ready penetration and engagement of the hook fiber engaging portion of a hook fastener element. Generally, this requires that the sheet of fibers is nonconsolidated or the fibers are not bonded at the points where the individual fibers cross.

Figure 2:
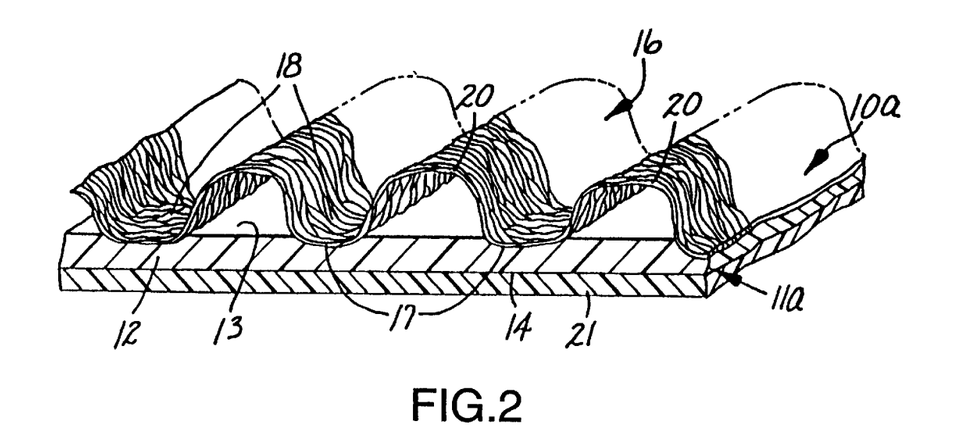
FIG. 2 is a perspective view of a second embodiment of a sheet of loop material according to the present invention.

FIG. 2 illustrates a second embodiment of a sheet of loop material according to the present invention, generally designated by the reference numeral 10a, loop material 10a generally has the same structure as the sheet of loop material 10 (the same reference numerals being used with respect to the corresponding portion thereof) except that backing 11a of the sheet of loop material 10a includes a second sheet of backing material(s) 21. The second sheet of backing material 21 is adhered on the side 14 of the thermoplastic backing layer 12 opposite the sheet of fibers 16. The second sheet of backing material 21 in the backing 11a of the sheet of loop material 10a preferably is a polymeric film or consolidated nonwoven web which can be printed on one of its surfaces to provide a sheet of loop material 10a on which the printing (which could be decorative, indicate a trade name, or provide instructions) can be clearly seen through the sheet of fibers 16. The second sheet of backing material 21 is preferably a polyethylene film formed of a polyethylene polymer or copolymer, with blends also being possible. In this case the backing material 12 also preferably is a blend containing from 50 to 15 percent by weight polyethylene (preferably 30 to 15 percent) to allow autogeneous bonding between backing layers 12 and 21. The polyethylene polymer or copolymer content of backing layer 21 is preferably from 50 to 100, most preferably 80 to 100 percent by weight. The polyethylene polymer or copolymer can be low density, linear low density, ultra low density, high density, or elastomeric polyethylenes or copolymers, preferred are low density polyethylenes.

Figure 3:
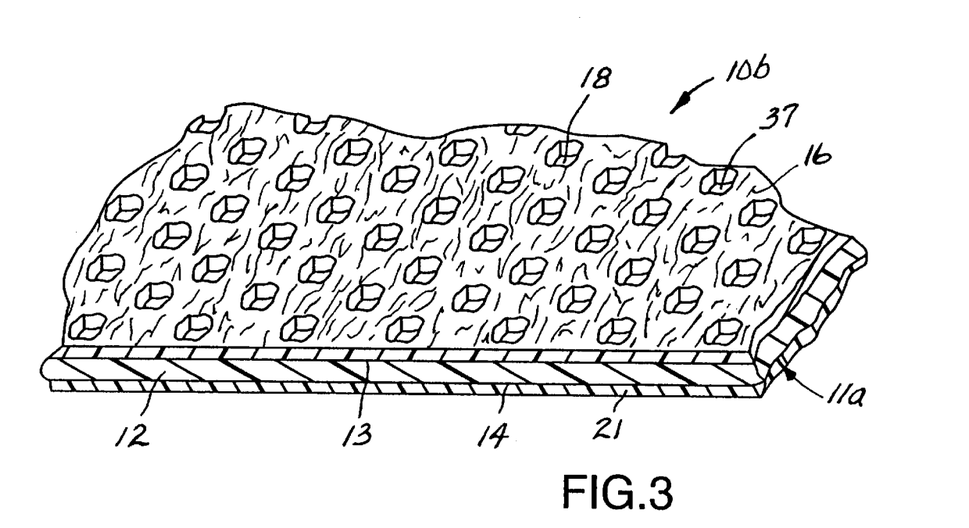
FIG. 3 is a perspective view of a third embodiment of a sheet of loop material according to the present invention.

FIG. 3 illustrates a third embodiment of a sheet of loop material according to the present invention, generally designated by the reference numeral 10b, loop material 10b generally has the same structure as the sheet of loop material 10a (the same reference numerals being used with respect to the corresponding portion thereof). A multiplicity of fibers in a non-deformed sheet of fibers 16 having generally non-deformed anchor portions 37 is autogeneously bonded to the backing layer 12. The bonding locations 18 in FIG. 3 are along the front surface 13. As shown in FIG. 3 the bonding locations can be a regular pattern of point bonds extending across the length and width of the sheet of loop material 10b. However the bonding locations can be arranged in any pattern including, for example, regular or intermittent lines, hexagonal cells, diamond square, square cells, random point bonds, crosshatched lines, or any other regular or irregular geometric pattern.

Figure 4:
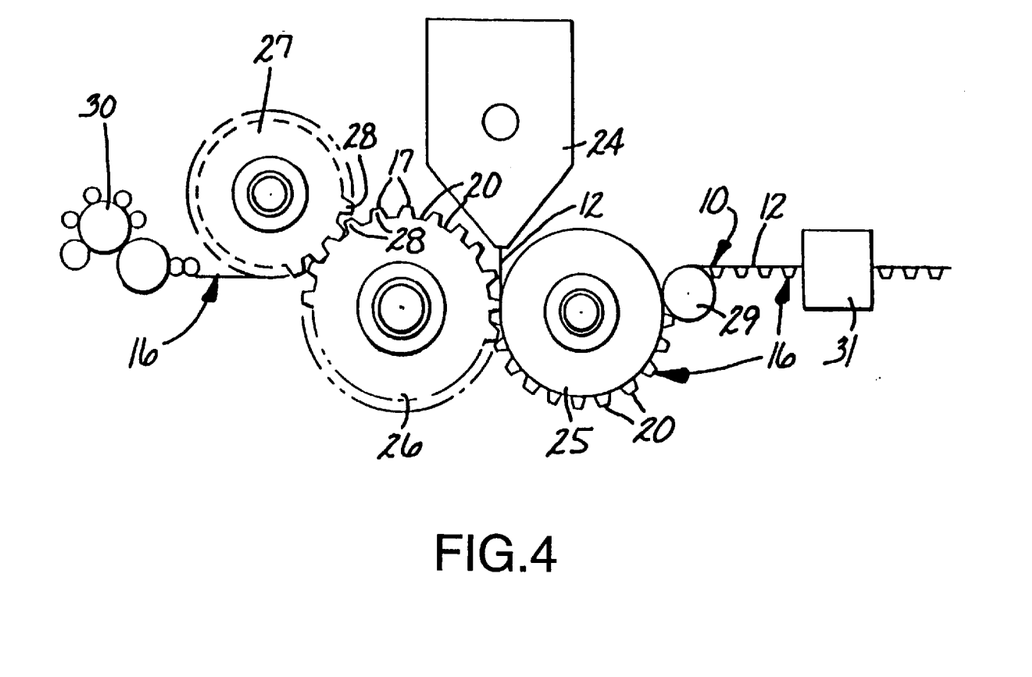
FIG. 4 is a schematic view illustrating a method of forming the sheet of loop material of the invention depicted in FIG. 1.

FIG. 4 schematically illustrates a method and equipment for forming the sheet of loop material 10 shown in FIG. 1. The method illustrated in FIG. 4 generally comprises forming a sheet of fibers using a nonwoven fiber web 16 so that it has arcuate portions 20 projecting in the same direction from spaced generally parallel anchor portions 17 of nonwoven web 16, and bonding the spaced generally parallel anchor portions 17 of the nonwoven web 16 to the backing layer 12. This method is performed in the FIG. 4 method by providing first and second corrugating members or rollers, 26 and 27 each having an axis and including a plurality of circumferentially spaced generally axially extending ridges 28 around and defining its periphery, with spaces between the ridges 28 adapted to receive portions of the ridges 28 of the other corrugating member, 26 or 27, in meshing relationship with the nonwoven web or sheet of fiber 16 between the meshed ridges 28. The corrugating members 26 and 27 are mounted in axially parallel relationship with portions of the ridges 28 meshing generally in the manner of gear teeth; at least one of the corrugating members, 26 or 27, is rotated; and the nonwoven web or other type of sheet of fibers 16 is fed between the meshed portions of the ridges 28 of the corrugating members 26 and 27 to generally corrugate the sheet of fibers 16. The corrugated nonwoven web or other sheet of fibers 16 is retained along the periphery of the first corrugating member 26 after it has moved past the meshed portions of the ridges 28. In the FIG. 4 method a thermoplastic backing layer 12 is formed and bonded to the anchor portions 17 of the sheet of fibers 16 on the end surfaces of the ridges 28 on the first corrugating member 26 by extruding or coextruding the thermoplastic polypropylene backing layer 12 in a molten state from a die 24 into a nip between the anchor portions 17 of the sheet of fibers 16 on the periphery of the first corrugating member 26 and a cooling roll 25. This embeds the fibers of the nonwoven web or other sheet of fibers in the polypropylene backing layer. After cooling by the cooling roll 25 in the nip the sheet of loop material 10 is separated from the first corrugating member 26 and carried partially around the cooling roll 25 and through a nip between the cooling roller 25 and a pinch roller 29 to complete cooling and solidification of the polypropylene backing layer 12.

An alternative to extruding a film 12 is supplying a preformed backing layer, for example, in the form of a backing film into the nip formed between the first corrugating member 26 and a roll 25. The ridges on the corrugating member 26 and/or the roll 25 are heated so as to thermally bond the film backing to the sheet of nonwoven fibers. This alternative applies to all the method embodiments shown in, for example, FIG. 4–8.

The sheet of fibers is preferably in the form of a nonwoven web product such as can be formed from loose discrete fibers using a carding machine 30, which nonwoven web of randomly oriented fibers 16 has enough integrity to be fed from the, e.g., carding machine 30 into the nip between the corrugating members 26 and 27 (if needed, a conveyer (not shown) could be provided to help support and guide the nonwoven web 16 between the carding machine 30 and the corrugating members 26 and 27). When such a nonwoven web 16 is used, preferably the first corrugating member 26 has a rough finish (e.g., formed by sand blasting), the second corrugating member 27 has a smooth polished finish, and the first corrugating member 26 is heated to a temperature slightly above the temperature of the second corrugating member 26 so that the nonwoven web 16 will preferentially stay along the surface of the first corrugating member 26 and be carried to the nip between the first corrugating member and the roller 25 after passing through the nip between the corrugating members 26 and 27.

Optionally, the backing 11 of the sheet of loop material 10 can be printed on its surface opposite the sheet of fibers 16 through the use of a printer 31, either in the production line as illustrated, or as a separate operation. Alternatively, a printer 31 could be used to print on and thereby color or print a pattern on the sheet of fibers 16 either in the production line as illustrated or as a separate operation.

Corrugating members 26 and 27, as shown in FIG. 4, adapted to have a sheet of fibers 16 fed into them can have ridges 28 oriented generally in the range of 0 to 45 degrees with respect to its axes, but preferably have its ridges 28 oriented at 0 degrees with respect to (or parallel to) its axes which simplifies making of the corrugating members 26 and 27.

Figure 5:
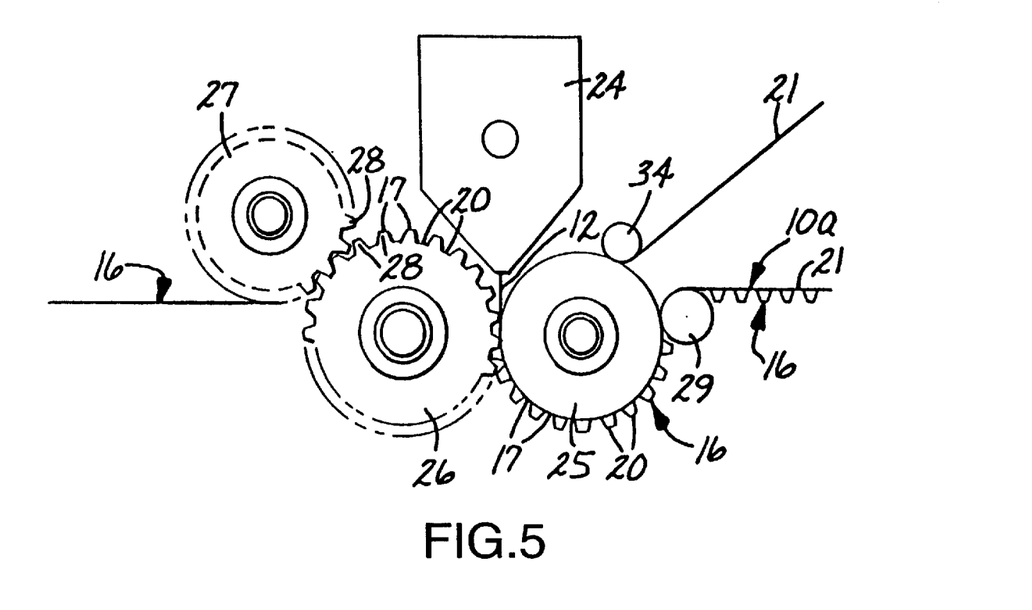
FIG. 5 is a schematic view of a second embodiment for producing the invention loop material of FIG. 2.

FIG. 5 schematically illustrates a second embodiment for forming sheets of loop materials 10a, as shown in FIG. 2, which method is generally the same and uses much of the same equipment as is illustrated in FIG. 4 (with similar portions of that equipment having the same reference numerals), except for the addition of means including a pinch roller 34 for feeding the sheet of backing material 21 or 22 into the nip between the first corrugating roller 26 and the roller 25 along the surface of the roller 25 which results in the extruded molten thermoplastic backing layer 12 from the die 24 being deposited between the formed sheet of fibers 16 and the sheet of backing material 21. The sheet of loop material 10a is then separated from the first corrugating member 26 and carried partially around the cooling roll 25 with its backing 11a against the cooling roll 25 to complete cooling and solidification of its thermoplastic backing layer 12.

Figure 6:
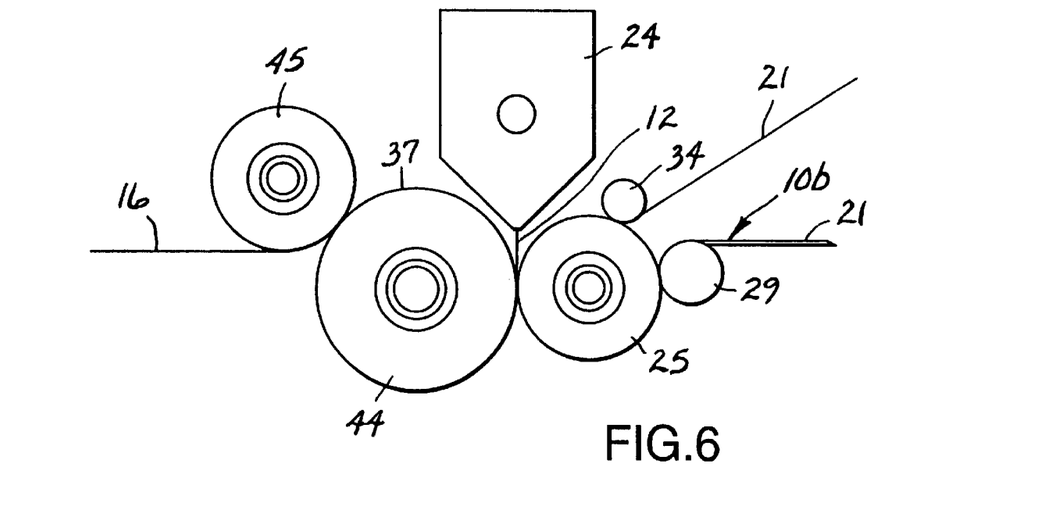
FIG. 6 is a schematic view of a third embodiment for producing the invention loop material of FIG. 3.

The cooling roll 25 in the embodiment shown in FIGS. 4–6, using an extruded film backing, can be water cooled and have a chrome plated periphery. Alternatively, the cooling roll 25 may have an outer rubber layer defining its surface which may be preferred for forming the sheet of loop material 10a if the sheet of backing material 22 is of a material (e.g., paper) that tends to restrict heat transfer into the cooling roll 25. If roll 25 is a heated roll this could be by means of an oil or water heated roll or an induction roll.

The sheet of backing material 21 incorporated in the backing 11a could be a woven, knitted, needle punched, nonwoven or other solid or porous layer of intertwined fibers, or could be a continuous polymeric film which allows the backing to be printed by conventional methods along one of its surfaces with graphics (such as advertising, instructions or locating marks) which will be visible through the loop portions 20 of the sheet of fibers 16 due to its large percentage of open area. Such film used for the sheet of backing material 21 may be single or multiple layer(s) of a polymeric material, however, is preferably a soft film material such as ethylene vinyl acetate or polyethylene, as described above. The sheet of backing material 21 could also be a layer of pressure sensitive adhesive on a release liner. The release liner would contact the cooling roller 25, resulting in the layer of pressure sensitive adhesive being disposed along the rear surface of the layer of thermoplastic material 12 with the release liner over the layer of pressure sensitive adhesive and removable so that the pressure sensitive adhesive could be used to adhere the sheet of loop material 10a to a substrate.

Preferably for an extrusion bonded or thermally bonded method using corrugating rolls 26 and 27 and a nip roll 25, the drives for the corrugating members 26 and 27 and for the roller 25 can be rotated at a surface speed that is the same as or different than, the surface speed of the first corrugating member 26. When the roller 25 and the first corrugating member 26 are rotated so that they have the same surface speed, the sheet of fibers 16 will have about the same shape along the backing 11 or 11a as it had along the periphery of the first corrugating member 26 as is illustrated in FIGS. 1 and 2. When the roller 25 and the first corrugating member 26 are rotated so that the roller 25 has a surface speed that is slower than the surface speed of the first corrugating member 26, (e.g., one quarter or one half) the anchor portions 17 of the sheet of fibers 16 will be moved closer together in the backing layer 12 at the nip between the roller 25 and the first corrugating member 26, resulting in greater density of the loop portions 20 along the backing 11 or 11a than when the cooling roller 25 and the first corrugating member 26 are rotated so that they have the same surface speed.

FIG. 6 schematically illustrates a third embodiment for forming the sheet of loop material 10b of FIG. 3, which method is generally the same and uses much of the same equipment as is illustrated in FIG. 6 (with similar portions of that equipment having the same reference numerals), except that the first and second corrugating member 26 and 27 are replaced by first and second cylindrical rollers 44 and 45. The sheet of fibers 16 is fed between the rollers 44 and 45 in a substantially non-deformed state. The sheet of fibers 16 is retained along the periphery of the first roller 44 the extruded molten thermoplastic backing layer 12 from the die 24 is deposited between the sheet of fibers 16 along the periphery of the first corrugating member 44 and the sheet of backing material 25. The molten polypropylene backing layer 12 envelopes and adheres to fibers on one face of the sheet of fibers 16 and to the sheet of backing material 21. The sheet of loop material 10b is then separated from the first roller 44 and carried partially around the cooling roll 25 to complete cooling and solidification of the thermoplastic backing 12. The roll 45 is preferably smooth and roll 44 is provided with ridges or peaks and valleys. The roll 44 is preferably heated to consolidate a nonwoven web of polypropylene fibers at the ridges or peaks first in the nip formed by 45 and 44 and then in the nip formed by roll 44 and roll 25. The polypropylene backing layer 12 envelop the fibers preferentially at these consolidated portions forming a loop material without arcuate portions.

The equipment illustrated in FIG. 6 could also be used to form the sheet of loop material 10b by not feeding the sheet of backing material 21 or 22 around the roller 25.

Figure 7:
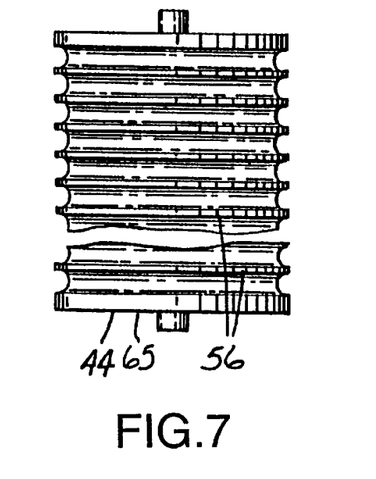
FIG. 7 is a side view of a corrugating member which could be substituted for the corrugating members illustrated in FIG. 4 or FIG. 5.
Figure 8:
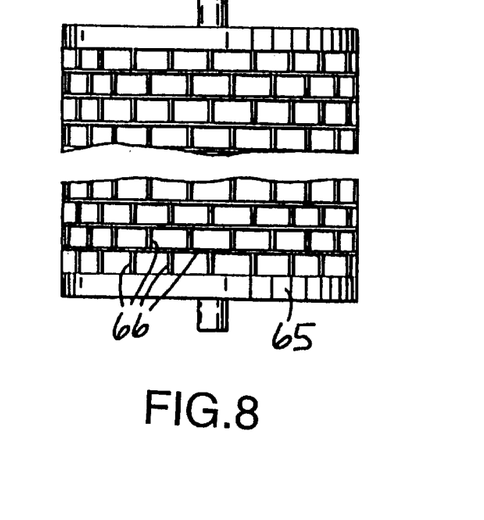
FIG. 8 is a side view of a second corrugating member which could be substituted for the corrugating members illustrated in FIG. 4 or FIG. 5.

FIGS. 7 and 8 illustrate two different corrugating members. One or a pair of cylindrical heated corrugating members 65 could be substituted for the corrugating member 26 and 27 or 44 to form a sheet of loop material using generally the methods described above with reference to FIGS. 4–6. The corrugating member 65 and its mating corrugating member, if provided, each have an axis and includes a plurality of ridges 56 or 66. The ridges 66 or 56 on each corrugating member defining spaces between the ridges 56 or 66, which spaces can be adapted to receive a portion of the ridges of another corrugating member in meshing relationship in the manner of a pair of gears. If desired, the ridges on a first corrugating member could be arranged in any suitable pattern including forming words, numbers or symbols to, for example, to form a trademark on the sheet of loop material 60.

The backing layer 12 preferably is a polypropylene homopolymer or copolymer film containing 30 to 100 weight percent of the low isotacticity polypropylene, preferably 50 to 85 weight percent, blended with 0 to 70 percent of a polyethylene polymer or copolymer, preferably 15 to 50 percent of the polyethylene polymer or copolymer. The backing layer 12 can contain other components such as higher isotacticity polypropylene (which can, in part, replace the low isotacticity polypropylene), other thermoplastic polymers, dyes, pigments, or melt additives provided that these additional components do not adversely affect the bonding of the backing layer 12 to the fibrous loop layer and/or the additionally supplied backing layer 21 or the like. The backing layer 12 can also be a coextruded film where at least the layer in contact with the sheet of fibers has the above percentages of polypropylene polymer and the backing as a whole has the above percentage of low isotacticity polypropylene. For example, a coextruded film layer 12 could comprise one or more polyethylene layers with intervening layers of polyethylene/polypropylene blends. Other tie layers and layer combinations are possible with use of the at least one polypropylene layer as described above.

The sheet of fibers 16 preferably is a nonwoven fibrous web material provided by carding as described above; however, other suitable methods for forming a fibrous nonwoven web can be used to form a nonwoven fibrous web loop layer such as Rando webs, airlaid webs, spun-lace webs, spun-bond webs, or the like. Generally, a nonwoven fibrous loop material using the above described webs is preferably not prebonded or consolidated to maximum the open area between the fibers. However, in order to allow preformed webs to be handled, it is necessary on occasion to provide suitable point bonding and the like which should be at a level only sufficient to provide integrity to unwind the preformed web from a roll and into the forming process for creating the invention nonwoven fibrous loop material.

Generally, the nonbonded portions of the sheet of fibers is from 65 to 95 percent providing bonding areas over from 5 to 35 percent of the cross sectional area the sheet of fibers, preferably the overall bonded area of the sheet of fibers is from 15 to 25 percent. The bonded areas include those areas of the sheet of fibers bonded to the backing layer as well as any prebonded or consolidated areas provided to improve web integrity. The specific bonding portions or areas bonded to the backing layer generally can be any width; however, preferably are from 0.01 to 0.2 centimeters in its narrowest width dimension. Adjacent bonding portions are generally on average spaced from 0.1 to 2.0 cm, and preferably 0.2 to 1.0 cm, apart. When the bonded portions are in the form of point bonds, the points are generally of substantially circular shape providing circular bonds preferably formed either by extrusion bonding or thermal bonding. Other shapes in the bonded and unbonded portions are possible, providing unbonded mounds or arcuate portions which are circular, triangular, hexagonal, or irregular in shape.

The basis weight of a sheet of fibers such as a nonwoven fibrous loop layer is substantially increased in the case of a corrugated loop layer which can increase the basis weight of the sheet of fibers 50 percent or more. If the loop layer is not corrugated, this increase in basis weight is not present in which case substantially higher basis weight webs and like sheets of fibers can be used as described above.

The fibers forming the sheet of fibers are generally polypropylene polymer or copolymer fibers within the above described denier range on average. The fibers can be continuous or discontinuous. Discontinuous fibers are used for example, for air laid or carded webs. The fiber length is not critical except in that the fibers length should be at least twice the average distance between adjacent bonding portion locations, preferably at least five times the average adjacent bonding distance. The sheet of fibers can contain other fibers blended with the polypropylene fibers such as polyethylene fibers, bonding fibers, coextruded fibers or the like. However, these fibers should generally be less than 50 percent of the total fibers by weight, preferably less than 30 percent by weight. Generally, these added fibers are not preferred in that they add cost or decrease performance. It is also possible to add further fibrous layers such as by needlepunching to the side of the polypropylene fibrous layer opposite that bonded to the backing layer.

In order to maintain the desirable softness of the sheet of fibrous loop material, the backing layer or layers generally has a thickness from 30 to 300 microns, preferably from 50 to 200 microns providing a soft nonwoven fibrous loop material laminate having an overall circular bend stiffness of less than 9N, preferably less than 7N, and most preferably from 6N to 2N, while also providing a sheet of loop material having sufficient tensile strength in order to be reliably used in continuous manufacturing techniques requiring a dimensionally stable material. The tensile strength of the sheet of loop material in at least one direction is at least about 1200 g/2.54 cm, preferably at least 1600 g/2.54 cm. If a secondary backing layer(s) is employed, the combined backing thickness is sufficient to provide a laminate having the above circular bend stiffness and tensile properties which generally is provided by having the combined backing layers having the above described overall thickness dimensions. However, the overall thickness dimensions can vary significantly depending on the selection of the materials used to form the backing layers (e.g., 12 and 21). Particularly, if additional nonfilm type material are used, such as thicker nonwovens or foam material, which could permit a significantly thicker overall backing.

Test Methods

135 Degree Peel Test

The 135 degree peel test was used to measure the amount of force that was required to peel a strip of a hook fastener material from a sample of the loop fastener material. The test was carried out at constant temperature and humidity in a room set at 23° C. and 50% relative humidity.

A 2 inch×5 inch (5.08 cm×12.7 cm) piece of the loop material to be tested was securely placed on a 2 inch×5 inch (5.08×12.7 cm) steel panel by using a double-coated adhesive tape. The loop material was placed onto the panel with the cross direction of the loop material parallel to the long dimension of the panel. A 0.75 inch×1 inch (1.90 cm×2.54 cm) strip of the hook fastener test material (XMH-5145, available from 3M Company) with a paper leader attached was then centrally placed on the loop panel so that the leading edge of the hook strip was along the length of the panel. The sample was rolled by hand, once in each direction, using a 4.5 pound (1000 gram) roller. The sample panel was then placed in a 135 degree peel jig and the jig was placed into the bottom jaw of an Instron™ constant rate of extension tensile tester. Without pre-peeling the sample, the end of the paper leader was placed in the upper jaw of the tensile tester so that there was no slack in the leader. A crosshead speed of 12 inch (30.5 cm) per minute, was used to record the peel which was maintained at 135 degrees. The load required to remove the hook fastener strip from the loop material was reported in grams/2.54 cm-width. Reported values in the table are an average of from 8–10 tests. Fiber pull out was also noted if it was observed during the peel testing.

Machine Direction (MD) Tensile Strength (Load at Yield)

This test method was a modified version of ASTM D 882 and was used to determine the tensile and elongation properties of the loop material. The test was carried out at constant temperature and humidity in a room set at 23° C. and 50% relative humidity. A 1 inch×3 inch (2.54 cm×7.62 cm) strip of loop material was cut in the machine direction. The strip was mounted in the jaws of an Instron™ constant rate of extension tensile tester, with the upper and lower jaws of the tester spaced 1 inch (2.54 cm) apart. The jaws were then separated at a rate of 10 inch (25.4 cm) per minute until the yield point was reached. The load at yield was recorded in pounds/inch-width and was converted to grams/2.54 cm width. The data (in grams/2.54 cm width) is given in Table II. Each data point represents an average of at least two tests.

Circular Bend Stiffness Test

The stiffness of the loop materials was tested using the Circular Bend Stiffness Test according to ASTM D 4302. The fabric stiffness tester used for testing was Model No. DFG10A available from J. A. King and Co., Greensboro, N.C. Per ASTM D 4302, a plunger was used to force a flat folded swatch of a 4 inch×8 inch (10.2 cm×20.3 cm) sample of the loop material through an orifice in a platform (loop side out). The maximum force required to push the sample through the orifice was an indication of the loop material's stiffness or resistance to bending. The more conformable the loop material, the lower was the resistance, thus requiring less force to push it through the orifice. The results were recorded in pounds-force and were converted to newtons. The data is given in Table II (in newtons). Each data point represents an average of ten tests.

Film Bond Failure Test

The Film Bond Failure Test was used to obtain an indication of the bond strength between the polypropylene backing layer and a printed film backing layer. A piece of the loop material was placed loop side down on a cutting surface. Without damaging the thermoplastic backing layer, a razor blade was then used to score lines on the printed film backing layer. The lines were placed approximately 1 cm apart in a cross-hatched pattern. An approximately 1 inch×5 inch (2.5 cm×12.7 cm) piece of filament tape (Scotch brand available from 3M Company) was rolled down two times onto the printed film backing using a using a 4.5 pound (1000 gram) roller. The tape was peeled by hand as fast as possible at an approximate 180° angle. If the printed film delaminated from the thermoplastic backing layer it was noted as a bond failure.

Materials

7C50 is an ethylene-propylene impact copolymer resin available from Union Carbide Corp., having an isotacticity of 89.6% as determined by [13]Carbon Nuclear Magnetic Resonance ($^{13}$C NMR)[1].

"SRD" 7560 is an ethylene-propylene impact copolymer resin available from Union Carbide Corp.

"REXFLEX" W101 is a polypropylene homopolymer having a melt flow rate (MFR) of 14, and an isotacticity of 48.5% (as determined by $^{13}$C NMR[1]), available from Rexene Corp.

"REXFLEX" W112 is a polypropylene homopolymer having a MFR of 20, and an isotacticity of 50.8% (as determined by $^{13}C$ NMR[1]), available from Rexene Corp.

"REXFLEX" W108 is a polypropylene homopolymer having a MFR of 20, and an isotacticity of 67.3% (as determined by $^{13}C$ NMR[1]), available from Rexene Corp.

"REXFLEX" W104 is a polypropylene homopolymer having a MFR of 30, and an isotacticity that is the same as "REXFLEX" W112, available from Rexene Corp.

1020 is a low density polyethylene resin having a melt index (MI) of 2.0 and a density of 0.923 grams/cm$^2$. available from Rexene Corp.

1058 is a low density polyethylene resin having a MI of 5.5 and a density of 0.922 grams/cm$^2$, available from Rexene Corp.

"PETROTHENE" 951 is a low density polyethylene resin having a MI of 2.2 and a density of 0.92 grams/cm$^2$, available from Quantum Chemical Corp.

"PLEXAR" 5298 is a modified ethylene-vinyl acetate copolymer tie-layer resin available from Quantum Chemical Corp.

[1] "$^{13}C$ NMR" spectra were obtained in a solution of dichlorobenzene at 110° C. on a Unity 500 MHz NMR Spectrometer according to known standard methods.

EXAMPLES

All of the loop materials in the Examples were prepared in accordance with the method described in Example 3 and illustrated in FIG. 6 of U.S. Pat. No. 5,256,231. The fibers that were used to prepare the carded sheet of fibers for the loop materials were 9 denier polypropylene fibers obtained under the commercial designation T-196 from Hercules, Inc. The basis weight of the sheet of fibers (after corrugation) was 45 grams/meter$^2$. The sheet of backing material that was adhered on the side of the thermoplastic backing layer opposite the sheet of fibers was a 1 mil (25.4 microns) thick blown polyethylene printed film (#CP4-4 available from Crystal Print, Little Chute, Wis.) except for Comparative Examples C1, C23, C24 and Examples 20–22 which utilized a 1.2 mil (30.5 microns) cast polypropylene film. The polypropylene (PP) and polyethylene (PE) resin types and ratios (by weight) that were used to extrude the thermoplastic backing layer for the Examples are given in Table I. For the examples the basis weight of the thermoplastic backing layer was 45 grams/meter$^2$ except for Examples 7 and 8 which had basis weights of 40 grams/meter$^2$, and Examples 20–22 and Comparative Examples C23 and C24 which had basis weights of 35 grams/meter$^2$.

TABLE I

| Example | PP Resin Type | PE Resin Type | PP:PE |
| --- | --- | --- | --- |
| C1 | 7C50 | — | 100:0 |
| C2 | 7C50 | — | 100:0 |
| C3 | SRD 7560 | — | 100:0 |
| C4 | SRD 7560 | 1058 | 75:25 |
| C5 | SRD 7560 | 1058 | 50:50 |
| C6 | SRD 7560 | 1058 | 25:75 |
| C7 | — | 1058 | 0:100 |
| 8 | "REXFLEX" W104 | "PETROTHENE" NA951 | 50:50 |
| 9 | "REXFLEX" W101 | "PLEXAR" 5298 | 50:50 |
| 10 | "REXFLEX" W112 | 1058 | 75:25 |
| 11 | "REXFLEX" W112 | 1058 | 25:75 |
| 12 | "REXFLEX" W112 | 1020 | 75:25 |
| 13 | "REXFLEX" W112 | 1020 | 50:50 |
| 14 | "REXFLEX" W112 | 1020 | 25:75 |
| 15 | "REXFLEX" W101 | 1058 | 75:25 |
| 16 | "REXFLEX" W101 | 1058 | 25:75 |
| 17 | "REXFLEX" W101 | 1020 | 75:25 |
| 18 | "REXFLEX" W101 | 1020 | 50:50 |
| 19 | "REXFLEX" W101 | 1020 | 25:75 |
| 20 | "REXFLEX" W101 | — | 100:0 |
| 21 | "REXFLEX" W104 | — | 100:0 |
| 22 | "REXFLEX" W108 | — | 100:0 |
| C23 | 7C50 | — | 100:0 |
| C24 | SRD 7560 | — | 100:0 |

The loop materials were tested for 135 Degree Peel, MD Tensile at Yield, Circular Bend Stiffness and Film Bond Failure as described above. Results are given in Table II.

TABLE II

| Example | Circular Bend Stiffness | MD Tensile at Yield | 135 Degree Peel | Film Bond |
| --- | --- | --- | --- | --- |
| C1 | 16.4 | 3995 | 621 | no delamination |
| C2 | 13.7 | 3541 | 554 | delaminated |
| C3 | 13.3 | 3437 | 605 | delaminated |
| C4 | 9.43 | 2828 | 495 | deiaminated |
| C5 | 7.30 | 2483 | 509* | no delamination |
| C6 | 7.16 | 2329 | 343* | no delamination |
| C7 | 7.43 | 2088 | —** | no delamination |
| 8 | 4.76 | 1952 | 616 | no delamination |
| 9 | 5.21 | 1861 | 525 | no delamination |
| 10 | 5.74 | 2329 | 782 | no delamination |
| 11 | 6.01 | 2193 | 698* | no delamination |
| 12 | 5.56 | 2056 | 1056 | no delamination |
| 13 | 5.78 | 2374 | 652 | no delamination |
| 14 | 6.41 | 2769 | 768* | no delamination |
| 15 | 4.58 | 2088 | 479 | no delamination |
| 16 | 6.67 | 2438 | 531* | no delamination |
| 17 | 4.54 | 2134 | 614 | no delamination |
| 18 | 4.76 | 2347 | 585 | no delamination |
| 19 | 4.85 | 2270 | 689* | no delamination |
| 20 | 6.76 | — | — | — |
| 21 | 7.48 | — | — | — |
| 22 | 8.99 | — | — | — |

TABLE II-continued

| Example | Circular Bend Stiffness | MD Tensile at Yield | 135 Degree Peel | Film Bond |
|---------|-------------------------|---------------------|-----------------|-----------|
| C23     | 11.9                    | —                   | —               | —         |
| C24     | 11.3                    | —                   | —               | —         |

*Fiber pull out observed
**Complete fiber pull out observed

The examples show that softer, more conformable loop materials can be obtained by using lower crystallinity polypropylene and blends with polyethylene as the extrudate for the thermoplastic backing layer of the loop material. This can be achieved while maintaining good bond strength between the polypropylene fibers and the backing layer of the loop material. Good bond strength was also maintained between an additional printed polyethylene film backing layer and the backing layer comprising the lower crystalline polypropylene polymer and blends.

Comparative Example C1, prepared by extrusion bonding a higher crystallinity polypropylene thermoplastic backing layer in combination with a printed cast polypropylene film backing layer, was very stiff and non-conformable. The stiffness of the loop material was reduced somewhat by extrusion bonding this polypropylene thermoplastic backing layer to a printed polyethylene film backing layer (Comparative Examples C2 and C3); however, delamination between the two backing layers readily occurred. A softer loop material which had good bond strength between the backing layer and the printed polyethylene film backing layer was obtained when a 100% polyethylene extrudate was used for the backing layer (Comparative Example C7); however, fiber pull out was observed during peel testing indicating poor bond strength between the polypropylene fibers and the polyethylene backing layer of the loop material. Stiffness was also reduced somewhat, and the bond strength between the backing layer and the printed polyethylene film backing layer improved, by using blends of conventional higher crystallinity polypropylenes and polyethylene for the thermoplastic backing layer (Comparative Examples C4, C5, and C6); however, this resulted in either poor bonding between the polypropylene fibers and the thermoplastic backing layer (C5 and C6) or in poor bonding strength between the blended thermoplastic backing layer and the printed film layer (C4).

The Examples also show that as the amount of the lower crystallinity polypropylene in the extrudate blend was increased, the softness of the loop material also increased. However, fiber pullout was observed when the extrudate blends contained lower levels of the lower crystallinity polypropylene (25%), suggesting that a decrease in the bond strength between the polypropylene fibers and the blended backing layer was beginning to occur.

Examples 25 and 26 and Comparative Example 27

Examples 25 and 26 and Comparative Example 27 were prepared in a manner similar to that described for the Examples above except that a preformed backing was thermally bonded to the corrugated fiber sheet instead of extruding a thermoplastic backing layer to the fiber sheet. This type of thermal bonded loop material and the method for making it is generally described in European Patent No. 341 993 B1. The carded web was prepared from 15 denier polypropylene fibers (Type EC-486 available from Synthetic Industries) and was point bonded (bond area 15%). The basis weight of the fiber sheet (before corrugation) was 45 grams/meter$^2$. For these examples the basis weight of the film backing was 80 grams/meter$^2$. The film backing compositions are given in Table III along with 135 Degree Peel and Circular Bend Stiffness data.

TABLE III

| Example | PP Resin Type | PE Resin Type | PP:PE | 135 Degree Peel | Circular Bend Stiffness |
|---------|---------------|---------------|-------|-----------------|-------------------------|
| 25      | "REXFLEX" W112 | 1020         | 75:25 | 1304            | 12.0                    |
| 26      | "REXFLEX" W112 | —            | 100:0 | 1296            | 10.7                    |
| C27     | SRD 7560      | —             | 100:0 | 1100            | 25.8                    |

These examples demonstrate that soft loop materials can be made by thermal bonding a film backing to a fibrous sheet when the film backings comprise lower crystallinity polypropylene.

We claim:

1. A soft fibrous loop material laminate comprising:
   a loop layer formed from a sheet of fibers comprised predominantly of fibers formed of polypropylene polymer, copolymer or blend thereof; and
   a backing layer autogeneously bonded to the loop layer comprising polypropylene polymer or copolymers having a percent isotacticity of less than 70 percent which loop material has a circular bend stiffness of less than 9N and a tensile strength of at least 1200 g/2.54 cm-width.

2. The fibrious loop material of claim 1 further comprising an additional layer bonded to the backing layer face opposite that bonded to the loop layer.

3. The loop material of claim 2 wherein the additional layer is a printed layer.

4. The loop material of claim 1 wherein the backing layer is a film layer.

5. The loop material of claim 4 wherein the backing film layer comprises a blend of from 30 to 100 weight percent polypropylene polymer or copolymer and 0 to 70 weight percent polyethylene polymer or copolymer.

6. The loop material of claim 5 wherein an additional layer comprising a polyethylene polymer or copolymer film layer is bonded to the backing layer face opposite that bonded to the loop layer.

7. The loop material of claim 6 wherein the additional film layer is a printed film.

8. The loop material of claim 5 wherein the backing layer is a blend of:
   50 to 85 weight percent polypropylene polymer or copolymer;
   15 to 50 weight percent of a polyethylene polymer or copolymer.

9. The loop material of claim 1 wherein the loop layer is a nonwoven web formed predominantly of discrete length polypropylene fibers.

10. The loop material of claim 9 wherein the nonwoven web comprise a blend of polypropylene and other fibers.

11. The loop material of claim 9 wherein the polypropylene fibers comprise at least 50 weight percent of the fibers of the nonwoven fibrous web loop layer.

12. The loop material of claim 11 wherein the polypropylene fibers comprise propropylene homopolymer fibers.

13. The loop material of claim 1 wherein the loop layer is extrusion bonded to a film backing layer.

14. The loop material of claim 1 wherein the loop layer is thermally bonded to the backing layer.

15. The loop material of claim 13 wherein the loop layer is a nonbonded sheet of fibers.

16. The loop material of claim 1 wherein the loop layer is a carded web.

17. The loop material of claim 1 wherein the loop layer is a corrugated sheet of fibers.

18. The loop material of claim 17 wherein the corrugated sheet of fibers is a nonwoven fibrous web having peak and valley portions.

19. The loop material of claim 1 wherein the backing layer has a thickness of from 30 to 300 microns.

20. The loop material of claim 18 wherein the peak portions are arcuate portions forming from 65 to 95 percent of the backing layer cross sectional area.

21. The loop material of claim 18 wherein the corrugated web peaks and valleys are in the form of ridges extending along a given extent of the backing layer.

22. The loop material of claim 18 wherein the corrugated web peaks and valleys are discrete arcuate portion peaks, each peak having valleys on at least three sides.

23. The loop material of claim 13 wherein the backing layer has generally uniform crystalline or morphological properties.

24. The loop material of claim 1 wherein the loop layer is a nonwoven fibrous web having a basis weight of from 15 to 100 grams/m$^2$.

25. The loop material of claim 1 wherein the loop layer is a nonwoven fibrous web having bonded regions and unbonded regions the unbonded region forming the mounds.

26. The loop material of claim 25 wherein the arcuate mounds are regular in shape.

27. The loop material of claim 25 wherein the mounds are irregular in shape.

28. The loop material of claim 25 wherein the mound portions comprise from 95 to 65 percent of the cross sectional area of the nonwoven fibrous web loop layer of the loop material.

29. The loop material of claim 25 wherein the bonded region comprises from 15 to 25 percent of the cross sectional area of the nonwoven fibrous web loop layer in the loop material.

30. The loop material of claim 25 wherein the bonded regions are bonded to the backing layer and have a width of from 0.01 to 0.2 cm and adjacent bonded portions are spaced on average from 0.1 to 2.0 cm apart.

31. The loop material of claim 13 further comprising an additional layer bonded to the backing layer face opposite that bonded to the nonwoven loop layer.

32. The loop material of claim 31 wherein the additional layer is a fibrous web.

33. The loop material of claim 31 wherein the additional layer is a film layer.

34. The loop material of claim 32 wherein the additional film layer is a printed film.

35. The loop material of claim 33 wherein the additional film layer comprises a polyethylene polymer or copolymer film layer.

36. The loop material of claim 35 wherein the additional film layer is extrusion bonded to the backing layer.

37. The loop material of claim 36 wherein the backing layer is a blend of polypropylene polymer or copolymer and a polyethylene polymer or copolymer.

38. The loop material of claim 37 wherein the backing layer comprises a blend of from 50 to 85 weight percent polypropylene and 50 to 15 weight percent low density polyethylene.

39. The loop material of claim 1 wherein the backing layer is a coextruded film layer.

40. The loop material of claim 1 wherein the loop material has a tensile strength of at least 1600 g/2.54 cm width.

* * * * *